INVENTOR.
Ted W. Birk.
BY

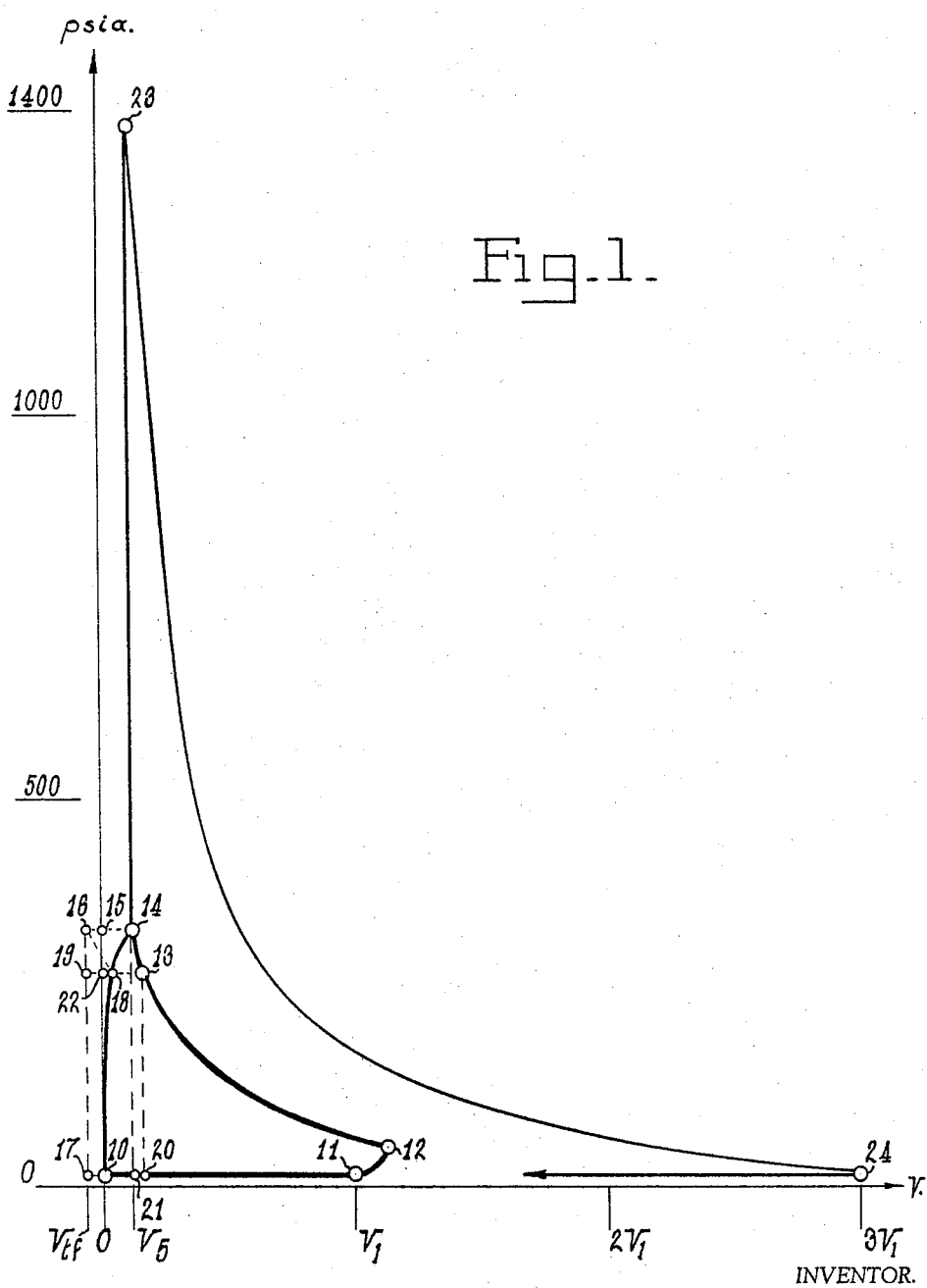

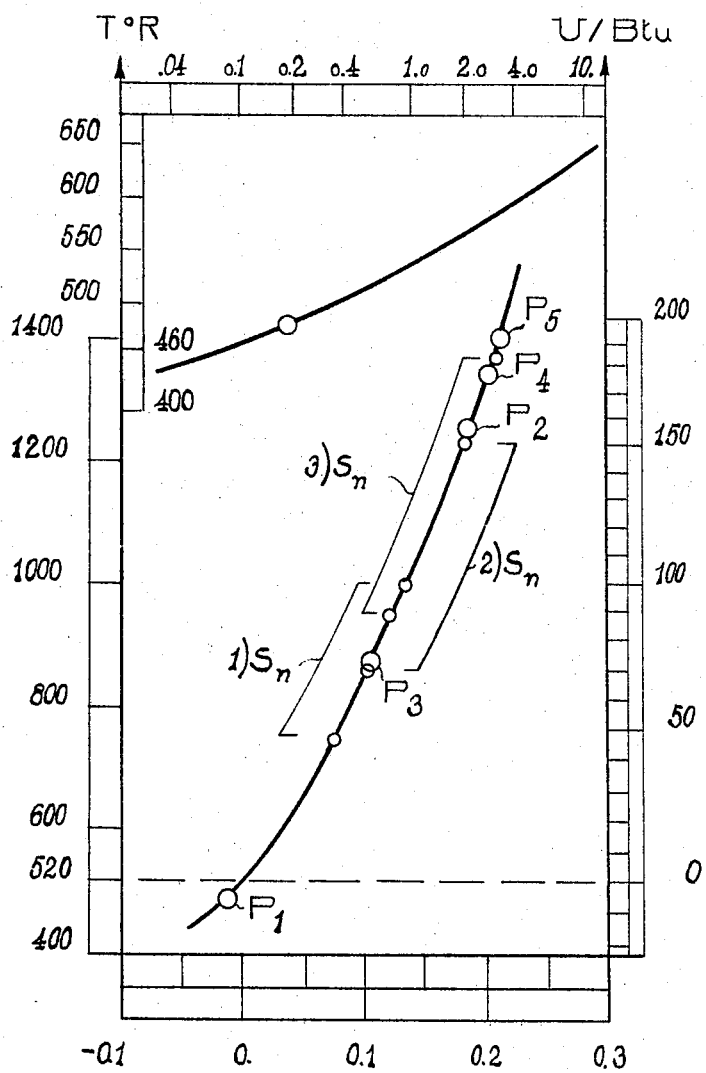

INVENTOR.
Ted W. Birk

United States Patent Office 3,279,442
Patented Oct. 18, 1966

3,279,442
INTERNAL COMBUSTION ENGINE
Ted W. Birk, P.O. Box 865, Berlin, N.Y.
Continuation of application Ser. No. 188,292, Mar. 14, 1962. This application May 17, 1965, Ser. No. 459,147
39 Claims. (Cl. 123—1)

The present application is a continuation of my presently pending application Serial No. 188,292 filed March 14, 1962 and entitled Cycle for Internal Combustion Engine, which application Serial No. 188,292 is a continuation-in-part of my previous applications Serial No. 764,958 filed October 2, 1958 and entitled Cycle for Internal Combustion Engines (now abandoned); Serial No. 757,800 filed August 28, 1958 and entitled Gyro Engine and Improvement in Combustion Engines of the Rotary Type (now abandoned); and Serial No. 617,816 filed October 23, 1956 and entitled Rotary Internal Combustion Engine, now U.S. Patent No. 2,878,793 dated March 24, 1959.

This invention relates to improvements in internal combustion engines and more particularly to an improved internal combustion engine of the positive displacement rotary type and to a new and improved internal combustion engine cycle having particular utility in engines of the positive displacement rotary type.

It is a primary object of the present invention to provide a new and improved internal combustion engine cycle for increasing the engine thermal efficiency and to an improved rotary internal combustion engine which operates on my new and improved cycle.

It is another object of the present invention to provide a new internal combustion engine cycle having a sequence of thermodynamic steps or phases which are particularly adaptable to varying engine thermodynamic requirements for increasing the thermal efficiency of the engine.

Among the novel features of the invention is the provision of a thermodynamic cycle for increasing the density of the inducted charge and therefore the volumetric efficiency of the engine without the need for supercharger-type devices.

Instead of depending solely upon engine heat for the evaporation of the liquid fuel particles in the inducted charge, I employ, to insure the maintenance of the charge density potential, a closed-chamber mixing of the inducted charge and a compressed and hot return charge in order to provide a superior homogeneous fuel/air mixture and, at the same time, solve the over-compression problem inherent in conventional rotary engine cycles.

According to further features of the invention, the whole pressure potential of the combustion process is translated into rotative forces through a substantially full expansion process to considerably increase the cycle efficiency.

Further features of the invention apply to a prolongation of the power stroke, approaching the "one-stroke" or "full-revolution" cycles, thus providing higher mean effective pressures than achievable with conventional cycles and designs.

With the above primary objects in view, it is another object of my invention to provide an internal combustion engine cycle with inherent adaptability to fuels of various octane numbers and to various climatic or atmospheric conditions for any fixed volumetric engine compression ratio.

It is still a further object of my invention to provide a cycle with the characteristic of a noiseless discharge feature, by compensating the lower pressure intervals of a discharge pulsation, which results from a charge flow acceleration and deceleration pattern of the scavenging step, with a superimposed air charge entering the system under pressure. The noiselessness of such discharge step, resulting from the engine process itself rather than through specific damping devices like back-pressure creating mufflers, has long been demanded by the Armed Forces and civilian purchasers alike.

In spite of all these improvements no intricate arrangements of engine components are required to accomplish the functioning of added cycle process steps or the refinement of others.

A further object of the invention is to provide three structural embodiments of the invention, i.e., a full-rotating engine, a swinging piston engine and a spoke-vane engine which exemplify the features and objects of the invention hereinbefore outlined.

The novel features of the invention will be described in detail, but it will be understood that various changes, especially in volumetric proportions which rule the specific thermal efficiency of the cycle, may be made in the form of the invention without departing from the spirit and scope thereof.

These and further objects of the invention should be appreciated from the detailed specification in conjunction with the drawings, in which like reference characters refer to similar parts throughout the several views, in which:

FIG. 1 is an indicator-card type diagram of an ideal cycle analysis, showing the pressure conditions and the relative volume of all subprocesses along the path of the new cycle;

FIG. 2 is a conventional temperature/entropy and a temperature/saturation pressure diagram for 100 percent correct fuel/air mixtures in a constant volume compression and in a charge saturation diagram for isooctane with indication points referring to the cycle analysis;

FIG. 3b is a transverse sectional view, partly in section and partly broken away, of a power of the engine embodiment of FIG. 3a;

FIG. 3c is a sectional view of a rotary valve cylinder of the engine of FIG. 3a;

FIG. 3d is a generally schematic view, partly in section, showing the timing chain of the engine of FIG. 3a;

FIG. 4b is a transverse sectional view, partly broken away and partly in section, of a power chamber of the engine embodiment of FIG. 4a;

FIG. 5b is a transverse sectional view, partly broken away and partly in section, of a power chamber of the engine embodiment of FIG. 5a.

Figure 3A:
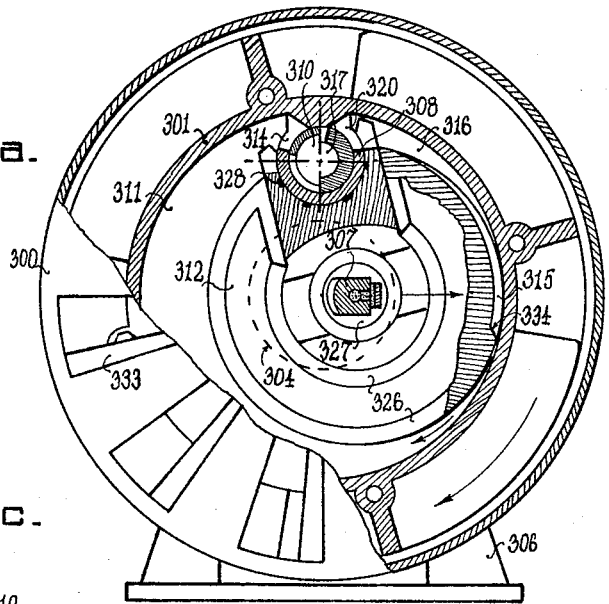
FIG. 3a is a transverse view, partly broken away and partly in section, showing the charge chamber of a fully rotating or gyro type engine embodying the present invention.

An induction process 10 to 11 in FIG. 1 is proposed which differs from the conventional carburetor-charge induction of Otto engine cycles insofar as no manifold heat ($Q_{in}$) is added to the fuel air mixture, thus forcing the liquid fuel spray in the charge to take the needed evaporation heat from the air in the charge. This process reduces the overall mixture temperature as well as increases the charge density considerably.

Such a cooled charge is neither homogeneous nor fully evaporated, but rather heterogeneous and wet. The advantage of its greater density can, nevertheless, only be utilized in a full evaporation process by the addition of heat in a closed-chamber to maintain the charge density.

Path 11 to 12 in FIG. 1 shows the effect of a return charge of a compressed and hot mixture (10–21–14–15) which is released into the inducted charge in the charge section of the compression chamber. By mixing with the cooled, inducted charge, this hot return charge not only raises the pressure and temperature level of the newly inducted charge but creates through a turbulent release and mixing process a most homogeneous and well evaporated mixture charge without any loss in charge density.

In the now larger charge section, induction plus storage charge displacement, actual engine work compression begins at 12. This process is assumed to be adiabatic as usual, but it effects two instead of only one basic charge, the newly inducted charge and the return charge, which form a combination charge, and the adiabatic compression proceeds conventionally to point 13, which is on a level slightly below the nominal engine compression ratio.

Simultaneous with the last portion of this portion of the compression step a small fraction of the transfered compressed charge 10–15–16–17, trapped in the transfer valve, expands into the steadily increasing displacement of of the combustion chamber 10–18–22 of the power section by valve action; thus establishing substantially uniform pressure level between the combustion chamber, the transfer valve and the compression chamber pressure at point 13, and as a result prevent charge back-flow into the compression chamber when the transfer valve opens at this particular time.

Continuing the compression work, the final engine compression is reached at 14 whereat the compression step is completed and the transfer valve closes toward both the compression chamber and the combustion chamber, leaving a fully compressed charge 15–16–17–10 trapped in the transfer valve, a return charge portion 14–15–10–21 in the remaining or return section of the compression chamber and a work charge 10–15–14–21 in the combustion chamber.

It may be observed at this point that the whole compression step from 11 through 12 and 13 to 14 is continuous in its pressure rise with the final work charge having the highest pressure potential of the whole process; thus, overcompression conditions usually present in rotor engines using conventional cycles are eliminated in favor of higher engine and cycle efficiencies of the cycle of the present invention.

A new return charge is now ready to be released into the newly inducted charge in the charge section, thereby forming a new combination charge. At the same time, the transfer valve contains a charge which remained from the previous transfer step and which will soon expand slightly into the combustion space of the combustion chamber to establish equal pressure conditions with the new compression step at 13 as described before.

With ignition of the work charge 10–15–14–21 in the power chamber taking place at 14 after closing of the transfer valve, the combustion pressure rises to 23.

Expansion proceeds from 23 to 24 in the combustion chamber in the usual manner, except that for the utilization of the whole pressure potential of the cycle a full expansion step is employed. In the ideal case an 8:1 engine compression ratio would amount to about $5_{V1}$, or five times the basic induction charge displacement. However, in practice the ratio will not exceed $3_{V1}$ as indicated in the diagram of FIG. 1. With this proportion heat transfer or loss will compensate for the lower ratio and still result in an actual open-throttle, full-expansion process for the cycle.

Discharge of the fully expanded gases follows the atmospheric condition path from 24 through 10 as indicated in FIG. 1. Since the exhausting step deals with fully expanded, and therefore relatively cool exhaust gases, the noise level of this exhausting step will be considerably reduced. A further reduction of discharging noise is provided by reducing the mean exhaust gas temperature and by minimizing discharge pulsation effects by adding cooling air to the exhaust gases as the exhaust gases are discharged from the combustion chamber. The cooling air is preferably added to the exhaust gases under a pressure which is slightly higher than the maximum discharge pressure of the exhaust gases to maintain continuous mixing during the exhaust step.

It should be appreciated that, in addition to the induction, evaporation and transfer steps, there has been introduced a return charge release, dealing with a fraction of the combination charge and split from the latter at the end of the compression step, which will customarily be considered as a compression work loss because of its irreversibility in the thermodynamic sense. However, the actual work spent is an investment rather than a loss because of the gain from a denser, rest-gas-free and much more homogeneous work charge thereby resulting in a high increase in over-all thermal efficiency of the whole cycle process and thereby making the new cycle a considerable improvement.

Furthermore, it is obvious that the precompression path 11–12 will depend on the relative compression ratio and temperature of the return charge. While the engine compression step 12–13–14 is based on a fixed volumetric change, the precompression step 11–12 depends on a steadily increasing temperature factor of the combination charge mixing process thereby pushing the entropy section of this process upwards with each new revolution of the shaft, as can be seen in the two entropy changes from $1S_n$ to $2S_n$ and to $3S_n$ in FIG. 2.

This upward trend is limited by heat transfer, thus creating a condition in which the intensity of a separate compression chamber cooling process will regulate the specific work charge end-temperature and therewith the actual compression ratio of the new cycle. This actual ratio will be considerably above the nominal or volumetric engine design ratio and depend on the available fuel, the heat transfer coefficient and the cooling system of the compression chamber.

Thus an engine with an 8:1 nominal or volumetric compression ratio and a limited compression chamber cooling will provide 10:1 or higher actual compression ratio conditions requiring at least 95 octane fuels for proper functioning. If these fuels are not available, the same "unchanged" engine will work trouble free with "intensified" compression chamber cooling to produce power in accordance with the lowest, i.e., the 8:1 nominal or design fixed volumetric compression ratio on 85 octane fuel. Therefore, inherent in the new cycle composition is a thermo-compression capacity not known heretofore.

The relative timing of the various steps, the relative volumes of return and transfer valve charges in relation to the inducted charge volume, as well as the relative ratio of the full expansion space, affect the final efficiency ratio.

Three different rotary combustion embodiments are presented, exemplifying the new cycle process hereinabove described.

Figure 3C:
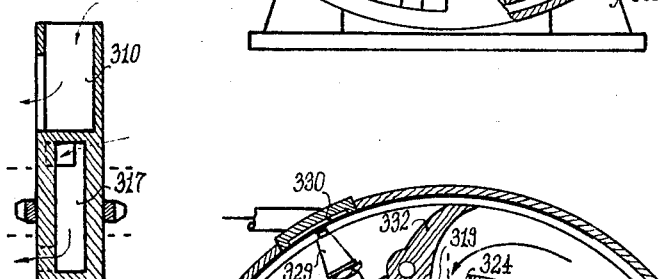
Figure 3D:
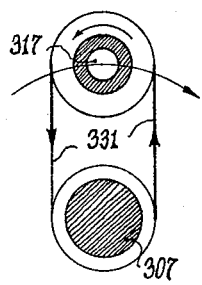
Figure 3B:
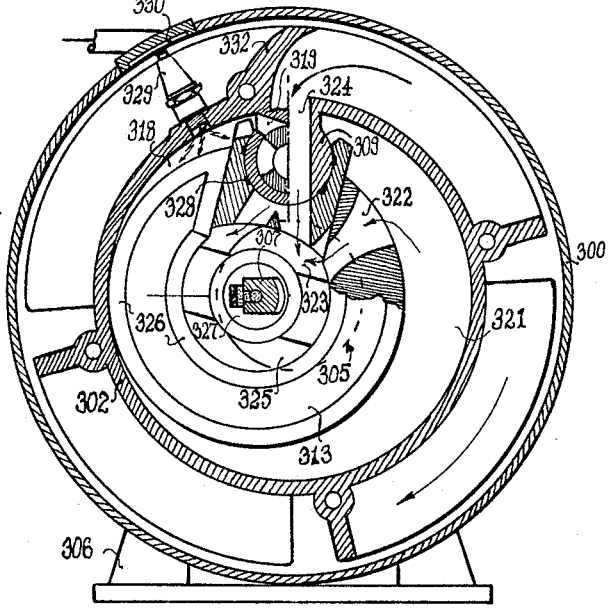

The compression chamber in FIG. 3a and the combustion chamber in FIG. 3b are the two principal sections of a full-rotating or gyro engine. One section is the compression chamber 301, surrounded preferably by a smaller number of cooling fins with air passages, and the other section is the combustion chamber 302, surrounded preferably by a larger number of cooling fins with air passages, both sections connected by bolts to render same rotatable around hollow shaft studs 304 and 305 pivoted in bearing supports 306 on both ends of the engine structure.

Passing through these hollow studs, as well as through the center portion of the whole engine structure, is a reaction force shaft 307 fixed to the bearing supports and having two cranks on which the pistons 312 and 313 are carried. Cylindrical vanes 308 and 309 are fixed to the chamber walls and provide the center of a ball joint by which the pistons are rotated around their offset shaft center.

A rotary intake and transfer valve assembly, FIG. 3c, is mounted inside the compression chamber vane and actuated by a timing chain 331. Return charge release is accomplished at timed intervals by a recess 315 in the wall of the compression chamber piston. Fuel charges from a carburetor (not shown) pass through the stud 304 and a channel connecting this stud with the induction port of the valve stud of FIG. 3c.

Figure 4A:
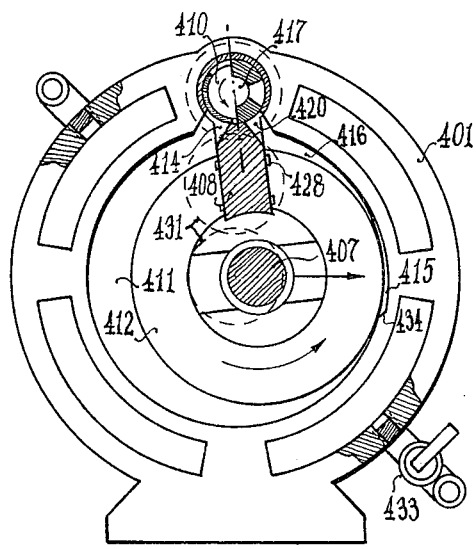
FIG. 4a is a transverse section view, partly broken away and partly in section of a charge chamber of a swinging piston or plunger engine embodying the present invention.
Figure 4B:
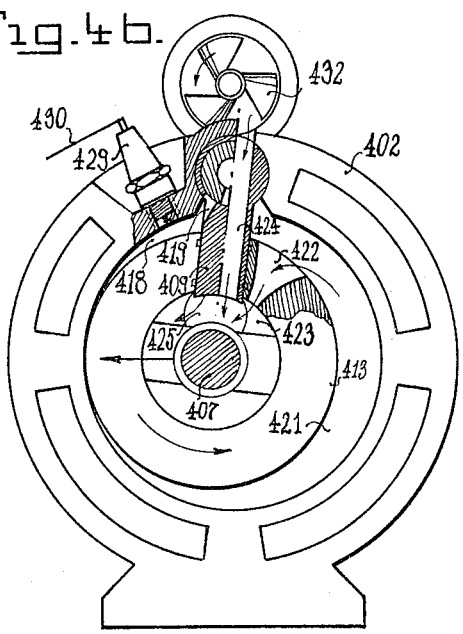

A second rotary combustion engine concept is represented in as winging piston or plunger engine, the compression and the combustion chamber units which are shown in FIGS. 4a and 4b. Built as a stator/plunger combination, this engine features a compression chamber section 401 and a combustion chamber section 402, separately but adjacently mounted in a common engine stator structure. Further shown are a crank shaft 407 on which the pistons 412 and 413 are carried, swinging vanes 408 and 409 pivoted in chamber-wall cylindrical ball joints, a rotary intake and transfer valve assembly on the principle of FIG. 3c mounted inside the vanes, a timing gear arrangement 431 and a timed return charge release accomplished by a recess 415 in the chamber wall of the compression chamber.

Figure 5A:
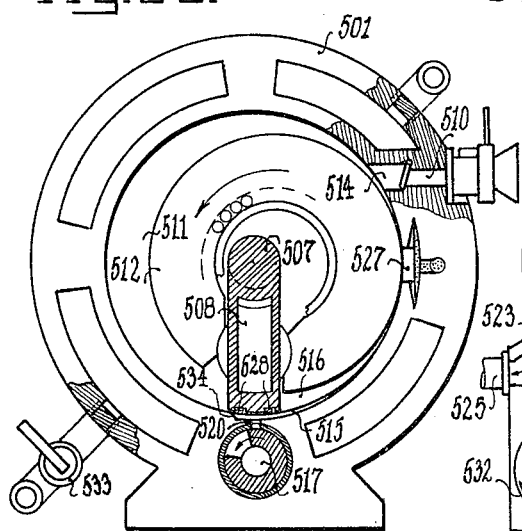
FIG. 5a is a transverse sectional view, partly broken away and partly in section, of a charge chamber of a spoke vane or rotor engine embodying the present invention.
Figure 5B:
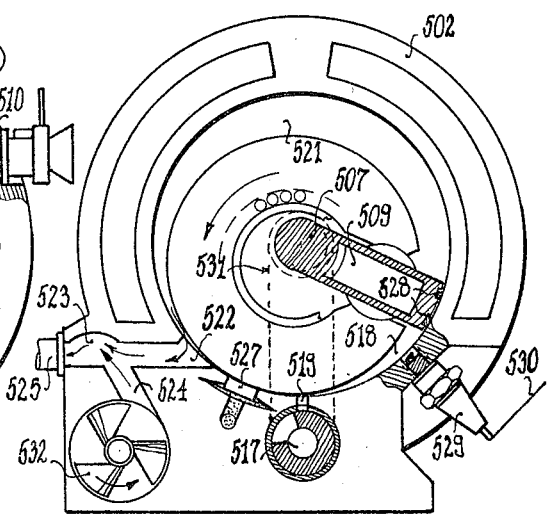

The third version of an application of the new cycle process is shown in relation to a spoke-vane or basic rotor engine design in FIGS. 5a and 5b. The compression chamber section 501 and the combustion chamber section 502 are again placed separately but adjacently in a common engine stator structure, a straight shaft 507 on which the vanes 508 and 509 are mounted like spokes, ball joints between the vanes and pistons, a timed intake valve in the compression chamber, a rotary transfer valve on the principle of FIG. 3c mounted in the engine stator, a timing chain arrangement 531 and a timed return charge release accomplished by a recess 515 in the chamber wall of the compression chamber.

With the cycle process proceeding uniformly in all three examples, the following process specifications refer to each of the examples notwithstanding the fact that different design components are employed to perform equal functions in different ways.

Fuel is diffused and mixed with air to form the induction charge in the charge section of the compression chamber of the engine without any special device being employed for the addition of heat as is required to achieve complete fuel evaporation in conventional engines. Therefore, this charge is forced to take heat from its own air fraction for a partial evaporation of the diffused fuel spray and thus remains in a wet and considerably cooled but high state of density.

Induction occurs at 310, 410 and 510 in FIGS. 3a, 4a or 5a, respectively. Induction vacuum is created in the charge section of the compression chamber 311, 411 or 511 by a piston 312, 412 or 512 and a vane 308, 408 or 508. This induction step is timed to be completed when the release wall recess 315, 415 or 515 opens a connection between the induction section 311, 411 or 511 and the adjoining return charge 316, 416 or 516 by the relative moment of the piston in regard to the contact sealing location which the piston maintains with the wall of its chamber.

This addition of a high pressure hot return charge to the cooled and wet induction charge through a turbulence-promoting recess nozzle 334, 434 or 534 provides superior evaporation and therefore a homogeneous combination charge which will have a temperature level above ambient. Also it is to be noted that in the engine embodiment of FIG. 3a the wall recess or passage 315 is located in the periphery of the piston 312 such that the nozzle 334 is adapted to direct the hot return charge against the wall of the compression chamber 301 to provide rapid evaporation of the liquid fuel fraction of the inducted charge which accumulates there due to centrifugal force.

The completion of the induction and the release steps makes up the first full engine or shaft revolution of the cycle process. From the beginning of the second revolution, piston and vane movements will decrease the chamber space in which the combination charge is located. Thus, compression work begins in the compression section of the compression chamber, while at the same time a fresh charge enters the newly formed charge section of the same compression chamber but on the opposite side of the vane in a manner described before.

At a timed interval, a transfer valve 317, 417 or 517, having a certain displacement of its own and being charged from the previous transfer step, will first open toward the combustion space 318, 418 or 518 of the combustion chamber 302, 402 or 502 of FIGS. 3b, 4b or 5b respectively, by releasing a small amount of charge through the transfer valve exit 319, 419 or 519 until the combustion space and the transfer valve charge pressure equals the compression pressure of the combination charge in the compression section of the compression chamber at that particular time, to prevent charge backflow through the transfer valve entrance 320, 420 or 520 (FIG. 1, 10–15–16–17 into 10–18–19–17).

With the transfer valve connecting in its open state the compression section of the compression chamber with the corresponding combustion space of the combustion chamber, the compression step proceeds until the volumetric engine compression ratio is accomplished, a complete work charge is transferred into the combustion space and a new return charge of equal pressure and temperature is separated to remain momentarily in the previously described return charge space 316, 416 or 516 (FIG. 1, 10–15–16–17). At this instant the transfer valve will close toward entrance and exit, trapping a work charge in the combustion space, a displacement charge in the transfer valve and a new return charge in the return charge space.

Ignition of the work charge follows in the combustion chamber, while a new release step begins in the compression chamber, thus repeating this portion of the cycle process. All engine design drawings show this ignition and release situation since all are of the compound or separate compression and combustion chamber concept with no clearance gas spaces present in these designs. A feature of this combination is a charge of the highest combustion temperature and pressure potential with the fastest propagation of flame after ignition.

Furthermore, it may be observed that a proportional increase in the expansion section displacement greater than the induction section displacement will promote higher efficiencies of the cycle process with maximum of a full-expansion possibility. The displacement ratio will depend on the compression ratio of the work charge, the combustion temperature and the heat-transfer factor for the design.

At the end of the expansion step the burned gases, like the combination charge before, change their relative position with reference to the vane. While the next transfer step, followed by ignition and expansion, is progressing on one side of the compression chamber vane as described above, the burned and fully expanded remainder of the gases in the discharge section 321, 421 or 521 is moved by the piston 313, 413 or 513 through a discharge channel 322, 422 or 522 inot the collector zone, 323, 423 or 523, where these gases are cooled and their pulsation is equalized by a superimposed cooling air stream entering the discharge system through a channel 324, 424 or 524. Thus, the internally cooled exhaust gases will finally leave the engine through the discharge port 325, 425 or 525 in a steady flow and relatively noiseless manner as described in the cycle analysis. Spokes carrying the rim of the combustion chamber piston may be shaped like fan blades to accelerate the discharge flow of the exhaust gas and air mixture from the collector zone 323.

All the steps of the new cycle process having been described, the main feature of this invention characterized as the thermal-compression-ratio-variable will be described.

Temperature and pressure of the combination charge, in accordance with the thermodynamic law governing the irreversibility of compression processes on gas mixtures, will continuously increase with each new return charge release resulting from the internal heat and pressure potential of that return charge and before actual compression work begins. Such temperature and pressure increases change the actual compression ratio condition of the resulting work charge and the remaining return charge and hence the over-all compression ratio of the engine.

The control of the desired compression maximum which depends upon the octane rating of the available fuel is brought about by a variation of the heat-transfer-flow rate from the compression chamber. Such variation can easily be accomplished manually or by thermostat in reducing the speed or the mass of the cooling medium affecting this compression chamber. For a cooling system using air as the medium, a shutter 333 at the front of the engine cover 300 will be sufficient; and in the case of water cooling, a flow reduction valve 433 or 533 would regulate the separate cooling process for the compression chamber without interferring with the combustion chamber cooling.

In the air cooling system as shown in FIGS. 3a and 3b, the engine cover 300, connected to the bearing supports 306, may feature a venturi-like contraction around the joint between the compression and the combustion chamber to direct cooling air flow into the joint section between both chambers. Shutters 333 in the rear lid of the engine cover, being equal to those in the front lid, may be used to vary cooling air discharge volume which is allowed to bypass the catcher fin 332, thus reducing or increasing cooling air induction volume used for the internal cooling process of the engine.

Discharge cooling and pulsation-equalization is accomplished by an air stream impelled by a catching fin 332 of the rotating engine structure (FIG. 3b), or by separate fan systems 432 or 532 as shown in FIGS. 4b and 5b.

Since proper sealing of the various pressure sections in all engine devices presented is essential for efficient cycle functioning means to effect such sealing are therefore described. Piston rings 326 provided to seal the piston surfaces against the chamber ends are placed in grooves with a conic outward rim to slide upward and outward by ring tension at engine stand-still and by centrifugal forces at engine speed.

Equal rings are provided (but not shown) for the pistons in FIGS. 4a, 4b, 5a and 5b. To secure proper separation between charger and compression sections or between combustion and discharge sections, sealing of the pistons against the chamber bores is utilized.

This is accomplished by devices 327 having the form of a piston bearing mounted on slides movable on shaft 307 (or 407, but not shown) actuated by spring tension or oil pressure, or both, and compensating at the same time for heat expansion of the chamber and piston. The sealing shoe 527 replacing such bearing assembly in FIGS. 5a and 5b is actuated in the same manner by spring tension or oil pressure, or both, acting against a diaphragm on which the shoe is mounted.

Vane sealing bars 328, 428 or 528 will further improve the gas-tight operation of the power plants and the proper functioning of the cycle process.

Spark plugs 329, 429 or 529 either receive ignition current the conventional way from a wire connection 430 or 530, or by a closely placed spark-jump-terminal 330; preferably extended circumferentially together with the receiving tip of the spark plug 329, to permit variation in timing the firing of said spark plug according to speed and load conditions of the engine.

Said spark-jump-terminal being mounted stationary on the engine cover 300 and placed to be opposite the plug position on the rotating engine structure when the latter is in its general ignition position (FIG. 3b).

Valve timing may be accomplished by a timing chain 331, which rolls off a fixed reaction force shaft 307 in FIG. 3d, by gear sets 431 or by a conventional timing chain drive 531.

Assuming an 8:1 volumetric compression ratio and a return charge means temperature restricted to 1250° R. using isooctane of 2,363,991 B.t.u. mole, the thermal efficiency of the new cycle process will be approximately 58% ideal and close to 52% actual for the proposed cycle process.

As will be apparent to persons skilled in the art, various modifications and adaptations of the structure above described will become readily apparent without departure from the spirit and scope of the invention, the scope of which is defined in the appended claims.

I claim:
1. An internal combustion engine cycle comprising the steps of inducing a fuel and air mixture charge, adding a portion of a compressed combination charge from a preceeding cycle to the induced fuel and air mixture charge to form a homogeneous combination charge, compressing the combination charge, adding a portion of the compressed combination charge to the induced fuel and air mixture charge of a succeeding cycle providing for combustion of a remaining portion of the compressed combination charge, expanding the gases resulting from combustion of said remaining portion of the compressed combination charge, and exhausting the expanded gases.

2. An internal combustion engine cycle comprising the steps of inducing a fuel and air mixture charge into a compression chamber, adding a portion of a compressed charge from a preceding cycle to the induced fuel and air mixture charge to form a substantially homogeneous combination charge, compressing the combination charge in the compression chamber, transferring a work charge portion of the compressed combination charge into a combustion chamber, returning a portion of the compressed combination charge to the induced fuel and air mixture charge of a succeeding cycle, igniting the work charge portion in the combustion chamber, expanding the gases resulting from the ignition of the work charge, and exhausting the expanded gases from the combustion chamber.

3. The cycle of claim 1 wherein the step of inducing a fuel and air mixture charge comprises the steps of partially evaporating the fuel in the mixture by extracting the needed evaporation heat from the internal heat potential of the induced air fraction of the fuel and air mixture charge to form a cooled and partly wet charge, and inducing the cooled and partly wet charge into a chamber substantially void of charge mixtures from preceding cycles to prevent a reduction in induction efficiency through the dilution and heat expansion.

4. An internal combustion engine cycle comprising the steps of inducing a fuel and air mixture charge into a compression chamber, adding a compressed charge part from the preceding cycle to said induced mixture charge subsequent to the completion of the inducing step to form a homogeneous combination charge, compressing said combination charge in accordance with the volumetric compression ratio of the engine, transferring a work charge part of the compressed combination charge into a combustion chamber, returning a remaining part of the compressed combination charge to the induced fuel and air mixture charge of the succeeding cycle, said transferring step being during the high pressure portion of said compression step, said returning step being the step of adding a compressed charge part in the succeeding cycle, igniting said transferred work charge part for combustion of the work charge part in the combustion chamber, expanding the gases resulting from the combustion of the ignited charge, and discharging the expanded gases from the combustion chamber.

5. The internal combustion engine cycle of claim 1 wherein the step of adding a portion of a compressed combination charge from a preceding cycle comprises the step of adding said charge portion to a newly induced fuel and air mixture charge by intermingling the added charge portion to the induced fuel and air mixture charge in a turbulent manner and in a closed chamber for complete fuel evaporation without density losses.

6. The internal combustion engine cycle of claim 2 wherein the cycle further includes the step of cooling said compression chamber to regulate by an adjustable heat transfer rate the thermal level of the transferred work charge portion of the compressed combination charge in accordance with fuel grades and engine work conditions.

7. The internal combustion engine cycle of claim 2 wherein a certain charge fraction of the compressed combination charge is trapped following the transfer step of the preceding cycle and wherein the trapped charge fraction of the preceding cycle is transferred to the combustion chamber prior to the transferring of the work charge portion into the combustion chamber to substantially equalize the pressure conditions in the combustion chamber and the compression chamber to prevent backflow into said compression chamber during the transfer step.

8. The internal combustion engine cycle of claim 2 wherein the work charge portion transferred into the combustion chamber is compressed substantially throughout the transferring step and with the maximum pressure being reached near the end of the transferring step and just before ignition of the work charge in the combustion chamber to prevent over-compression during the compression step and yet provide substantially maximum thermal efficiency of compression for the effective compression ratio of the engine.

9. The internal combustion engine cycle of claim 2 wherein the expanding step utilizes a larger expansion displacement than the compression displacement to increase the thermal efficiency of the engine cycle by the greater expansion of the gases inside the combustion chamber.

10. The internal combustion engine cycle of claim 2 wherein the cycle further comprises the step of cooling the gases exhausting from the combustion chamber adding and compensating for the volumetric pulsation resulting from the cyclic exhaustion of gases from the combustion chamber by the addition of a variable volume of cooling air to the exhaust gases.

11. An internal combustion engine having a casing with a pair of axially spaced chambers, first and second chamber dividing means for dividing the pair of chambers into induction and compression chamber portions and combustion and exhaust chamber portions respectively and including first and second piston means in the pair of chambers respectively and axially extending pivot means fixed to the casing and operatively connecting the first and second piston means to the casing, said first chamber dividing means being adapted for inducing a fuel and air mixture charge into the induction chamber portion, third means for adding a compressed and hot charge from the compression chamber portion of a preceding engine cycle to the induced fuel and air mixture charge in the induction chamber portion to form a substantially homogeneous combination charge, said first chamber dividing means further providing for compressing the combination charge in accordance with the effective volumetric compression ratio of the engine, fourth means for transferring a work charge part of the compressed combination charge from the compression chamber portion to the combustion chamber portion during the high pressure part of the compression of the induced charge, said third means returning a remaining part of the compressed combination charge to the induced mixture of the succeeding cycle subsequent to the transfer of the work charge part from the compression chamber portion, fifth means for igniting the work charge part in the combustion chamber, said second chamber dividing means being adapted for expanding the gases resulting from the ignition of the charge and for thereby translating the expansion of the gases into a rotatable engine output and for discharging the burned and expanded gases from the combustion chamber; all of said means hereinbefore recited being so cooperatively and correlatively associated, arranged and constructed such that a fuel and air mixture charge is induced into said compression chamber portion, a compressed and hot charge is added from a preceding cycle to the induced fuel and air mixture charge to form a homogeneous combination charge, the combination charge is compressed in accordance with the effective volumetric compression ratio of the engine, a work charge part of the compressed combination charge is transferred to the combustion chamber portion, a remaining part of the compressed combination charge is returned to the induced mixture of the succeeding cycle, the work charge part is ignited, the gases resulting from the ignition of the work charge part are expanded to provide a rotatable engine output and the expanded gases are discharged from the combustion chamber.

12. The internal combustion engine of claim 11 wherein said first chamber dividing means is further so cooperatively and correlatively associated, arranged and constructed such that a partial evaporation of the fuel in said induced mixture charge is effected by extracting the needed evaporation heat from the internal heat potential of the supplied air fraction of the mixture charge to form a cooled and partly wet induced charge of superior density.

13. The internal combustion engine of claim 12 wherein said first chamber dividing means is further so cooperatively and correlatively associated, arranged and constructed such that said partly wet charge is induced into said compression chamber without substantially any clearance volume to prevent charge density losses through dilution.

14. The internal combustion engine of claim 11 wherein said third means is further so cooperatively and correlatively associated, arranged and constructed such that said compressed and hot charge added from a preceding cycle is added to said induced fuel and air mixture charge by intermingling said compressed and hot charge with said induced fuel and air mixture charge in a turbulent manner and in said compression chamber portion for complete fuel evaporation without density losses.

15. The internal combustion engine of claim 14 further comprising sixth means for cooling said compression chamber portion to regulate by an adjustable heat transfer rate the thermal condition of the compressed combination charge in accordance with fuel grades and engine work conditions.

16. The internal combustion engine of claim 11 wherein the first and second chamber dividing means and said third and fourth means are further so cooperatively, correlatively associated, arranged and constructed such that the compression of the combination charge increases with the maximum being reached just prior to ignition of the work charge part to prevent over-compression of the combination charge during the compression phase of the engine cycle.

17. The internal combustion engine of claim 11 wherein the first and second chamber dividing means are so cooperatively and correlatively associated, arranged and constructed such that a larger displacement is utilized for the combustion and expansion of the work charge than the displacement available for the induction and compression of the fuel and air mixture charge to permit efficient expansion of the gasses inside the combustion chamber portion.

18. The internal combustion engine of claim 11 further comprising cooling means for cooling the combustion chamber portion and for adding cooling air to the gases exhausting from the combustion chamber portion.

19. The internal combustion engine of claim 18 wherein the cooling means is further so cooperatively and correlatively associated, arranged and constructed such that the cooling air is added to the exhausting gases to compensate for the cyclic volumetric pulsation resulting from the exhausting of the gases from the combustion chamber portion.

20. An internal combustion engine which comprises in combination, a structural container having bores providing separate compression and combustion chambers, a shaft structure passing through said structural container, a dividing means positioned in each of said separate chambers including a piston eccentrically mounted in the chamber and rotatable on said shaft structure, a single vane in each of said chambers slidably received within radial slots in the pistons, cylindrical ball joints for compensating for the eccentricity of the piston axis and for connecting the vane to the structural container, said pistons and said vanes being constructed and arranged such that operation of said pistons in association and correlation with said chamber bores creates increasing chamber sections on the rear sides of the vanes and decreasing chamber sections on the front sides of the vanes, a first valve means to introduce a mixture charge into the increasing chamber section of said compression chamber, a second valve means to release a hot and compressed charge from the previous cycle and in the decreasing chamber section into the increasing chamber section of the compression chamber, a third valve means to transfer a work charge part of the compressed combination charge at timed intervals from the decreasing chamber section of said compression chamber into the increasing chamber section of said combustion chamber, means to ignite the transferred combination charge in said combustion chamber, and discharge means for discharging exhaust gases from the decreasing chamber section of said combustion chamber.

21. The internal combustion engine of claim 20 further comprising first cooling means to cool said chambers externally and according to their different cooling requirements, second cooling means to cool said combustion chamber structure internally, and first sealing means to secure proper sealing pressure between said pistons and the bores of their chambers along a contact line.

22. The internal combustion engine of claim 20 wherein said structural container is rotatably supported, wherein the shaft structure passing through said structural container is stationary and includes crank-like sections on which said pistons are mounted for rotative movements, said first and said third valve means being part of a rotatable valve arrangement having two separate valving channels and commonly actuated by a drive arrangement connected to the stationary shaft structure.

23. The internal combustion engine of claim 20 wherein said shaft structure passing through said structural container is rotatably mounted and wherein said structural container is stationary, wherein said shaft structure has crank-like sections on which said pistons are mounted for rotatable movements, and wherein said first and said third valve means comprises a rotatable valve arrangement having two separate valving channels commonly actuated by a drive from the rotatable shaft structure.

24. An internal combustion engine which comprises in combination, a structural container having separate bores providing compression and combustion chambers, a shaft structure passing through said structural container, a separate piston eccentrically mounted in each of the separate chambers, means rotatably mounting the pistons on the shaft structure, a single vane in each of said chambers slidable within generally radially extending slots in said pistons, said pistons and said vanes constructed and arranged such that operation of said pistons in association and correlation with said chamber bores create increasing chamber sections on the rear side of the vanes and decreasing chamber sections on the front sides of the vanes, first valve means to introduce a mixture charge into the increasing chamber section of said compression chamber, second valve means to release a hot and compressed charge from the previous cycle and from the decreasing chamber section into the increasing chamber section of said compression chamber, third valve means to transfer a part of the compressed combination charge at timed intervals from the decreasing chamber section of said compression chamber into the increasing chamber section of said combustion chamber, means to ignite the transferred fuel charge in said combustion chamber, and means to discharge exhaust gases from the decreasing chamber section of said combustion chamber, said shaft structure passing through said structural container being of hollow construction and secured to said structural container, said shaft structure having crank-like sections on which said pistons are mounted for rotative movements, a rotatable shaft passing through said hollow shaft structure carrying said vanes.

25. The internal combustion engine of claim 20 further comprising first sealing means to secure proper sealing pressure between at least one of the pistons and its chamber bore which includes, an axial bushing in the piston mounted for movement along a radial track of the shaft structure to radially displace the bushing axis relative to the shaft structure, a compensation-space between the inner bore of the bushing and the shaft structure at the rear of said radial track, and means for forcing the bushing along its radial track for forcing the carried piston against the chamber bore.

26. The internal combustion engine of claim 20 further comprising sealing means to secure proper pressures between the pistons and their chamber bores which includes bushings in said pistons mounted for radial movement on bearing sections of said shaft structure to radially displace the bushing axes relative to the shaft structure, a first space provided between the inner bore of each bushing and the bearing section at the front of the path of radial movement, a compensation-space between the inner bore of the bushing and the bearing section at the rear of said path of radial movement to provide track length for the bushing movement, a bore in said shaft structure connecting the first space with the oil lubrication pressure system of the engine to force the bushing together with the piston hydraulically against the chamber bore, and an oil discharge channel connecting said compensation-space with the external surface of the bushing to permit lubrication oil in the compensation-space to be used for piston lubrication.

27. The internal combustion engine of claim 20 wherein the cylindrical ball joints are coaxial and wherein the first valve means to introduce a mixture charge is formed by a rotatable valve arrangement within the cylindrical ball joints and a port in one of the ball joints aligned to communicate with the increasing charge section of said compression chamber.

28. The internal combustion engine of claim 20 wherein the second valve means to release a hot and compressed charge from the previous cycle in the decreasing chamber section into the increasing chamber section of said compression chamber comprises bypass groove means adapted to connect the chamber sections in the compression chamber at timed intervals of the cycle, said bypass groove means having discharge nozzle means to induce turbulence into the mixing process by the release of the hot and compressed charge into combination with the induced mixture charge.

29. The internal combustion engine of claim 20 wherein the third valve means to transfer a work charge part of the compressed combination charge into the combustion chamber at timed intervals functions to trap a charge fraction from a preceding cycle and is adapted to open first toward the combustion chamber to release the trapped charge fraction into the combustion chamber and then toward the compression chamber.

30. The internal combustion engine of claim 22 wherein said means to ignite the transferred fuel charge includes, a spark plug in the wall of the rotatable structural container, and a stationary circumferentially extending ignition current terminal positioned to transfer ignition current to the passing spark plug at properly timed intervals according to the engine cycle.

31. The internal combustion engine of claim 20 further comprising cooling means to cool the combustion chamber internally which includes, a discharge passage through the combustion chamber piston, an exhaust collector chamber inside the combustion chamber piston adapted for communication with the discharge passage for receiving the exhaust gases, a channel through the combustion chamber vane to direct cooling air into the collector chamber for mixing with the exhaust gases in said collector chamber, and means to discharge the exhaust gases and cooling air mixture from said collector chamber.

32. The internal combustion engine of claim 20 wherein the structural container is rotatable and further comprising cooling means for cooling said chambers comprising a cylindrical cover surrounding the rotatable structural container, lids to close the front and rear sections of said cylindrical cover, compression chamber cooling air ducts in said front section, adjustable shutter means for adjusting the cooling air ducts in accordance with the compression chamber cooling needs, radially extending fan blades fixed to the structural container and within the cylindrical cover for directing cooling air between the cylindrical cover and the structural container.

33. The internal combustion engine of claim 20 wherein the structural container is rotatable and wherein the cooling means further includes a cylindrical cover surrounding the rotatable structural container, lids to close the front and rear sections of the cylindrical cover, first air ducts in said front section, second air ducts in said rear section, and shutter means in said second air ducts adjustable to vary the cooling air flow volume therethrough.

34. In a rotary internal combustion engine having a piston rotatably supported eccentrically within an operating chamber bore for peripheral sealing engagement with a cylindrical surface portion thereof, the improvement wherein the piston support comprises a shaft with a pair of diametrically opposed flat bearing surfaces, a piston journal bushing received on the shaft having inwardly facing flat bearing surfaces in engagement with the flat bearing surfaces of the shaft for adjustment of the journal sleeve in a radial direction on the shaft, and means for urging the journal sleeve in said radial direction for maintaining peripheral sealing engagement between the rotary piston and the cylindrical surface portion of the operating chamber.

35. In a rotary internal combustion engine having a piston rotatably supported eccentrically within an operating chamber bore for peripheral sealing engagement with a cylindrical surface portion thereof, the improvement wherein the piston support comprises a piston journal bushing rotatably supporting the piston; means for mounting the piston journal for radial displacement relative to the operating chamber bore comprising a journal bushing support having ways for adjusting the journal bushing radially thereon; and means for adjusting the journal bushing radially to maintain sealing engagement by the piston with the cylindrical surface of the bore.

36. An internal combustion engine which comprises in combination, a structural container having bores providing separate compression and combustion chambers; dividing means in each of the chambers including a rotatable piston eccentrically mounted in the chamber, a single vane slidably received within a radial slot in the piston, and a cylindrical ball joint for compensating for the eccentricity of the piston axis and for connecting the vane to the structural container; the pistons and the vanes being constructed and arranged such that operation of the pistons in association and correlation with the chamber bores creates increasing chamber sections on the rear sides of the vanes and decreasing chamber sections on the front sides of the vanes; and valve means for introducing a mixture charge into the increasing chamber section of the compression chamber, for transferring the compressed combination charge at timed intervals from the decreasing chamber section of the compression chamber into the increasing chamber section of the combustion chamber, and for discharging exhaust gases from the decreasing chamber section of the combustion chamber.

37. The internal combustion engine of claim 36 further comprising return passage means in the piston in the compression chamber providing periodic communication between the increasing and decreasing chamber sections of the compression chamber for returning a return charge part of the compressed combination charge from the decreasing to the increasing chamber section of the combustion chamber.

38. The internal combustion engine of claim 37 wherein the return passage means provides for directing the return charge toward the peripheral wall of the combustion chamber.

39. An internal combustion engine which comprises in combination, a structural container having bores providing separate compression and combustion chambers, dividing means positioned in each of the chambers including a rotatable piston eccentrically mounted in the chamber, said dividing means being constructed and arranged such that operation of said pistons in association and correlation with said chamber bores creates increasing chamber sections on the rear sides thereof and decreasing chamber sections on the front sides thereof, and valve means including return passage means in the piston in the compression chamber for periodically connecting the increasing and decreasing chamber sections in the compression chamber.

No references cited.

MARK NEWMAN, *Primary Examiner.*

F. T. SADLER, *Assistant Examiner.*